(12) United States Patent
Oshins et al.

(10) Patent No.: US 6,587,958 B1
(45) Date of Patent: Jul. 1, 2003

(54) EVENT TIMER

(75) Inventors: Jacob K. Oshins, Seattle, WA (US); David Richards, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,924

(22) Filed: Jun. 22, 1999

(51) Int. Cl.⁷ .................................................. G06F 1/04
(52) U.S. Cl. ....................................................... 713/502
(58) Field of Search ................................. 713/500, 502

(56) References Cited

U.S. PATENT DOCUMENTS

| | | | | | |
|---|---|---|---|---|---|
| 5,363,499 A | * | 11/1994 | Glass | .......................... | 711/108 |
| 5,463,761 A | * | 10/1995 | Culley | .......................... | 713/502 |
| 5,964,882 A | * | 10/1999 | Dey | .......................... | 713/502 |

OTHER PUBLICATIONS

Motorola Time Processor Unit Reference Manual, 1993, pp. 1–1 through 2–20.*

"CHMOS Programmable Interval Timer", *Intel specification 82C54*, 1–18, (Oct., 1994).

* cited by examiner

Primary Examiner—Dennis M. Butler
(74) Attorney, Agent, or Firm—Leydig, Voit & Mayer, Ltd (57) ABSTRACT

A system and method for generating timing signals is disclosed. The memory mapped timer system provides the ability to easily and efficiently program a timer to generate a periodic interrupt signal to a processing unit or a one-shot interrupt signal after a defined time delay. The system also provides the ability to set a programmable rollover value for a counter to define the time between interrupts. A high-resolution counter provides the ability to generate a periodic interrupt every one hundred nanoseconds.

15 Claims, 7 Drawing Sheets

; TIMER SETUP: COUNTER 0 FOR PERIODIC INTERRUPT, 15ms INTERVAL.
; THIS WOULD BE RUN ONCE, WHEN THE MACHINE WAS FIRST INITIALIZING.

403 — MOV   EDX, _TimerBaseAddress
406 — MOV   EAX, [EDX].TimerReload        ; READ THE RELOAD REGISTER
409 — OR    EAX, 01B                      ; SET THE BIT CORRESPONDING TO COUNTER 0.
412 — MOV   [EDX].TimerReload, EAX        ; WRITE THE RELOAD REGISTER
415 — MOV   EAX, 150000                   ; 150000 IS THE NUMBER OF TIMES
                                          ; THAT THE TIMER WILL TICK IN 15ms
418 — MOV   [EDX].TimerCounter0, EAX      ; LOAD THAT VALUE INTO COUNTER 0
421 — MOV   [EDX].TimerLatch, 10B         ; RESET THE LATCH REGISTER

FIG. 4A

TIMER PERIODIC INTERRUPT HANDLER CODE.

THIS WOULD BE RUN EACH TIME THE COUNTER GENERATED THE PERIODIC INTERRUPT.

427~MOV   EDX, _TimerBaseAddress

430~MOV   [EDX].TimerLatch, 10B        ; THIS INSTRUCTION GENERATES THE SINGLE
                                        ; WRITE TO THE HARDWARE NECESSARY TO
                                        ; HANDLE THE PERIODIC INTERRUPT.

```
; TIMER ONE-SHOT INTERRUPT SETUP USING COUNTER 0.
; ASSUME THAT ECX INITIALLY HOLDS THE TIME DESIRED FOR THE INTERRUPT
; IN 100ns UNITS.
;

603─ MOV    EDX, _TimerBaseAddress
606─ MOV    EAX, [EDX].TimerReload        ; READ THE RELOAD REGISTER
609─ AND    EAX, 1                         ; CLEAR THE BIT FOR COUNTER 1
612─ MOV    [EDX].TimerReload, EAX         ; WRITE THE RELOAD REGISTER
615─ MOV    [EDX].TimerCounter1, ECX       ; SET THE COUNTER VALUE
618─ MOV    [EDX].TimerLatch, 10B          ; RESET THE LATCH FOR COUNTER 1

; TIMER ONE-SHOT INTERRUPT HANDLER CODE
;
```

EVENT TIMER

FIELD OF THE INVENTION

This invention relates generally to the generation of timing signals in a digital system and more particularly to the generation of timing signals in a computer system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Microsoft Corporation, All Rights Reserved.

BACKGROUND OF THE INVENTION

The evolution of the hardware architecture of personal computers has not kept pace with the real time tasks that modern operating systems are asked to perform. For example, modern operating systems are asked to synchronize audio and video data streams. To perform this task successfully, an operating system needs access to timing signals that resolve time into fractions of microseconds. Unfortunately, today's hardware architectures are typically only capable of resolving time into microseconds.

The fixed frequencies used in personal computer timers are so low that the timers are not useful for performing many of the timing operations required in personal computers. One strategy for avoiding this limitation involves the use of "timing loops," in which a loop containing a group of instructions is calibrated and subsequently time is measured in terms of the number of iterations of the timing loop. For example, while booting an operating system a "timing loop" may be calibrated by first executing the loop twenty million times. The time to execute each pass through the loop is computed by dividing the execution time, obtained by reading a timer, by twenty million. Having calibrated the timing loop, a programmer may now measure time increments smaller than the finest timer increment by executing a "timing loop."

Unfortunately, this approach has several problems: First, there are external factors that can affect how fast the processor executes a timing loop. For example, a device performing I/O reads on the processor buss slows the execution of a timing loop. Second, while the processor is executing a timing loop, it isn't doing any other useful work. Third, modem computers have dynamically variable clock speeds. If for example, the machine gets too hot, the speed of the processor may be lowered so that it cools down. This requires timing loops to be re-calibrated each time the processor changes speed, which is impractical.

Another problem with the hardware architecture of many personal computer platforms is that the event timer interface is byte oriented. A byte oriented interface requires the use of many instructions to program the event timer, which makes the process of programming the timer a slow process. The time to program a timer may be reduced by executing code on a faster processor, but unfortunately, this is a very expensive solution.

For these and other reasons there is a need for the present invention.

SUMMARY OF THE INVENTION

The above-mentioned shortcomings, disadvantages and problems are addressed by the present invention, which will be understood by reading and studying the following specification.

Real time processing and timing of events in a computerized system is enabled by the use of a timer including memory mapped registers aligned on sixty-four bit word boundaries and a high frequency clock. Such a timer is easily programmed using a single assembler instruction to communicate with each of the memory mapped registers and is capable of providing both periodic and one-shot interrupts to a processing unit in the computerized system. Periodic interrupts enable an operating system to perform pre-emptive scheduling. Each interrupt provides the operating system with an opportunity to review the queued workload and reassign the processor to a different task, if necessary. One-shot interrupts enable the real time processing of single events.

A computerized system capable of supporting real time processing includes several components. A processing unit provides a platform on which an operating system and application programs can execute. A timer, capable of being controlled by the operating system, provides periodic and one-shot interrupts to the operating system for the timing of events. The timer includes a high frequency clock that drives two or more memory mapped counters which send interrupts to the operating system. The timer also includes a memory mapped reload register. The memory mapped reload register defines whether a memory mapped counter rolls over after decrementing to zero, or whether the memory mapped counter reloads to a value other than the rollover value after decrementing to zero. A memory mapped interrupt register coupled to the processing unit and at least one of the memory mapped counter registers stores an interrupt generated by the counters.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described. Finally, in the fifth section, a conclusion of the detailed description is provided.

Hardware and Operating Environment

Figure 1:
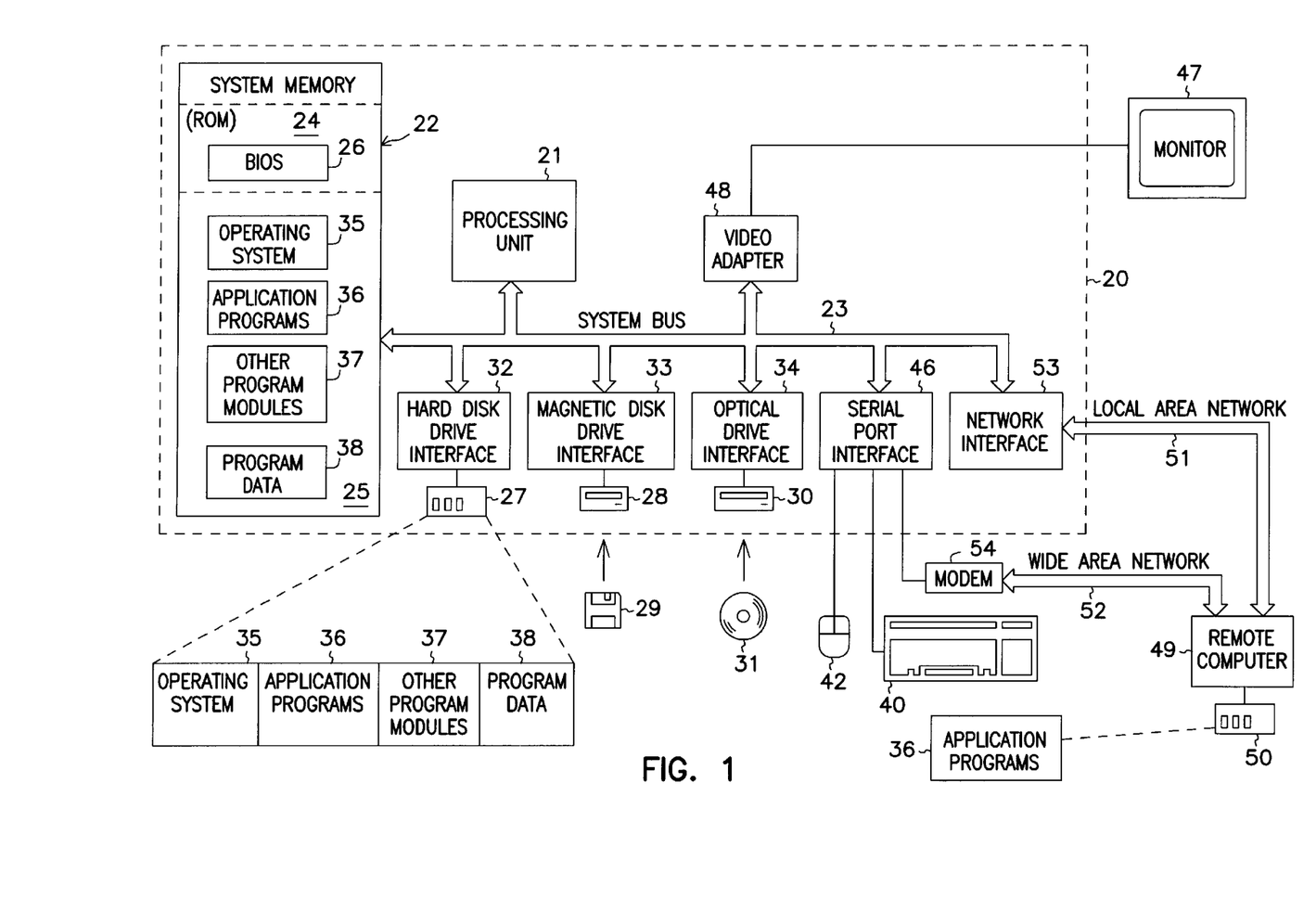
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include Other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically, includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2.

Figure 2:
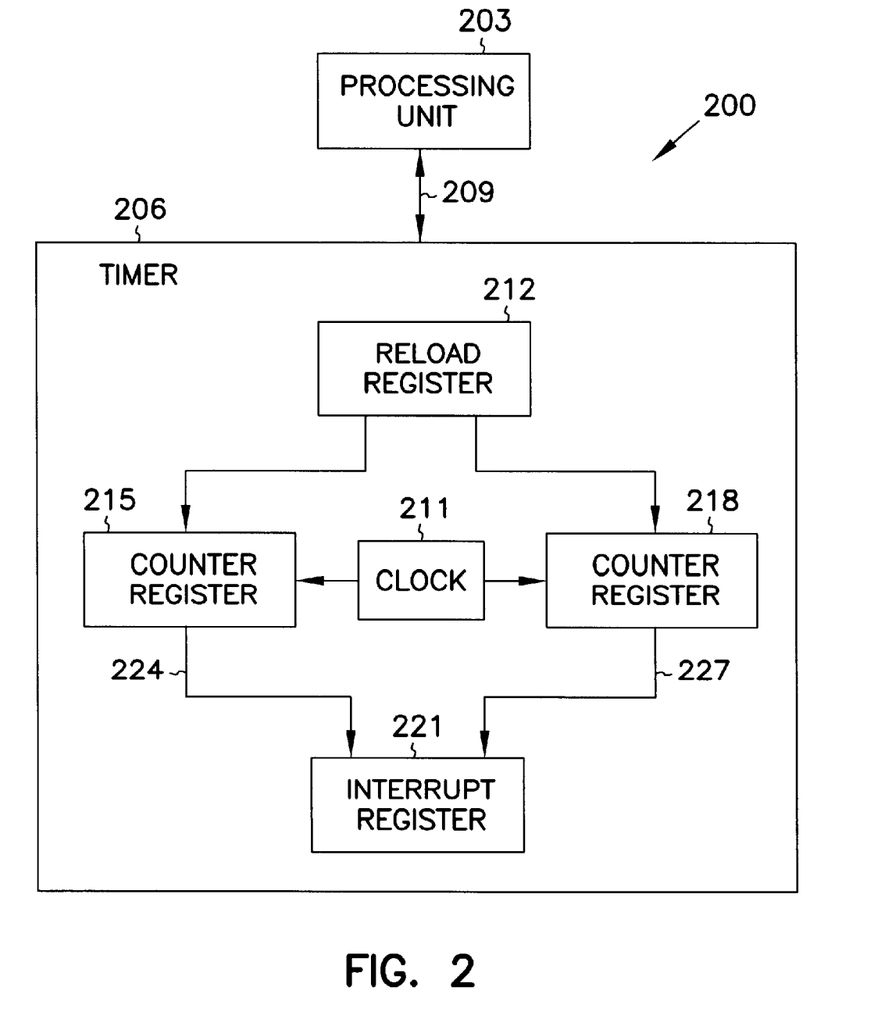
FIG. 2 is a diagram illustrating a system-level overview of an exemplary embodiment of the invention.

FIG. 2 shows one embodiment of computerized system 200 comprising processing unit 203 and timer 206 coupled together through system bus 209.

Processing unit 203 is also shown in FIG. 1 as processing unit 21 coupled to system memory 22 through system bus 23. Timer 206 shown in FIG. 2 can be implemented as an extension of system memory 22 shown in FIG. 1. When implemented as an extension of system memory 22, the memory mapped registers that are elements of timer 206 are addressable as memory mapped devices of processing unit 21.

Timer 206 shown in FIG. 1 comprises a plurality of registers and clock 211. In one embodiment, timer 206 comprises memory mapped reload register 212, first memory mapped counter register 215, second memory mapped counter register 218, and memory mapped interrupt register 221.

Each register, 212, 215, 218, and 221, can be configured as a memory mapped register having thirty-two bits or sixty-four bits. However, whether configured as a memory mapped thirty-two bit register or a memory mapped sixty-four bit register, each register, 212, 215, 218, and 221, is aligned on a sixty-four-bit word boundary. The purpose of this alignment is to enable efficient communication between processing unit 203 and each of the registers, 212, 215, 218 and 221. Efficient communication is achieved by using a single assembler instruction to transfer data between processing unit 203 and each register, 212, 215, 218, and 221. For example, in a processing unit, such as processing unit 203, executing a single assembler MOV instruction is sufficient to transfer thirty-two or sixty-four bits, depending on the architecture of processing unit 203, from a general purpose register in processing unit 203 to first memory mapped counter register 215 or from first memory mapped counter register 215 to a general purpose register in processing unit 203.

Processing unit 203, in one embodiment, is coupled to each memory mapped register, 212, 215, 218, and 221, and is capable of reading and writing each memory mapped register 212, 215, 218, and 221 over system bus 209. In addition, reload register 212, interrupt register 221, and clock 211 are coupled to first counter register 215 and second counter register 218.

Reload register 212 defines the mode of operation of first counter register 215 and second counter register 218. In one embodiment, two modes of operation are defined. The two modes of operation are described in relation to first counter register 215, but the description is also applicable to second counter register 218. In a first mode of operation, counter register 215 reloads a restart value, the last value written to counter register 215, after decrementing past its minimum value. In a second mode of operation, counter register 215 rolls over to its maximum value after decrementing past its minimum value. The mode of operation under which memory mapped counter register 215 or memory mapped counter register 218 operates is controlled by the value of a mode flag in reload register 212. In one embodiment, with the mode flag is set to a logical one value, counter register 215 is reset to the restart value after decrementing past its minimum value, and with the mode flag set to a logical zero value, counter register 215 rolls over to its maximum value after decrementing past its minimum value.

First memory mapped counter register 215 and second memory mapped counter register 218 are capable of counting monotonically and decrement at a frequency defined by clock 211. In one embodiment, clock 211 oscillates at a frequency of ten-megahertz, and memory mapped counter registers 215 and 218 decrement at a frequency of ten megahertz. If first memory mapped counter register 215 is decrementing at a frequency of ten-megahertz, then it is capable of sending an interrupt to processing unit 203 once every one hundred nanoseconds, which is a rate sufficient to support synchronization between the voice track and the video frames in a video processing application. The decrementing of the counters of the present invention is not limited to a particular frequency. Any frequency for which a counter can be fabricated is suitable for use in the present invention.

Memory mapped counter registers 215 and 218 can respond to a read or a write operation executed on processing unit 203. Each memory mapped counter register 215 and 218 responds to a read operation by returning the current count value. Each memory mapped counter register 215 and 218 responds to a write operation by making the current value of the counter equal to the value written. If the reload bit is set, then it also latches that write as a reload value. The restart value is the value that each of the counter registers 212 and 218 returns to at the end of its count sequence, if the reload register 212 mode of operation is set to the restart mode.

Each memory mapped counter register, 215 and 218, is capable of being reset to a particular value. In one embodiment, counter register 215 is reset to a value of all ones. In this embodiment, when operating counter register 215 decreases monotonically to a value of all zeroes, it rolls over to a value of all ones. In an alternate embodiment counter register 215 is reset to a value of all zeros. In this embodiment, when operating counter register 215 increases monotonically to a value of all ones, it rolls over to a value of all zeros. Counter register 215 can be designed to reset to any particular value within its range of values.

Each memory mapped counter register, 215 and 218, is capable of generating an interrupt signal. In one embodiment, when counter register 215 decrements to zero, memory mapped counter register 215 generates interrupt signal 224, which is capable of setting an interrupt flag in interrupt register 221, and when memory mapped counter register 218 decrements to zero, memory mapped counter register 218 generates interrupt signal 227, which is also capable of setting an interrupt flag in interrupt register 221. If an interrupt flag, is set in interrupt register 221, then, in one embodiment, an interrupt signal is also sent to processing unit 203 over system bus 209.

Interrupt register 221, in one embodiment, associates bit zero with counter 0 and bit 1 with counter 1.

Interrupt register 221, which, in one embodiment, associates bit 0 with counter 0 and bit 1 with counter 1, controls the delivery of interrupts to processing unit 203, and can be written and read by processing unit 203. Writing a logical one value into interrupt register 221 clears an existing interrupt associated with the bit written. Reading a logical one from interrupt register 221 indicates that an interrupt has been set by the corresponding counter, while reading a logical zero from interrupt register 221 indicates that an interrupt has not been set by the corresponding counter. Interrupt register 221 is capable of receiving interrupt signal 224 from counter register 215 and interrupt signal 227 from counter register 218. When interrupt signal 224 or interrupt signal 227 arrives at interrupt register 221, if there is no currently latched interrupt corresponding to the arriving interrupt, then the arriving interrupt is latched, and an interrupt signal is sent to processing unit 203 over system bus 209. In one embodiment, bit 0 and bit 1 of interrupt register 221 are each initialized to the value 1, which implies that the counters cannot deliver interrupts to the interrupt controller until the interrupt register 221 has been explicitly cleared. In one embodiment, interrupt register 221 is cleared by software.

The system level overview of the operation of an exemplary embodiment of the invention has been described in this section of the detailed description. In computerized system 200, timer 206 is capable of providing one-shot and high frequency periodic interrupt signals to processing unit 203 over system bus 209. Processing unit 203 is capable of efficiently defining to timer 206 and its memory mapped registers located on sixty-four bit boundaries the frequency of the periodic interrupt signals and the time delay associated with the one-shot interrupt signal. While the invention is not limited to any particular computerized system, for sake of clarity a simplified computerized system 200 comprising a processing unit 203 and timer 206 has been described.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
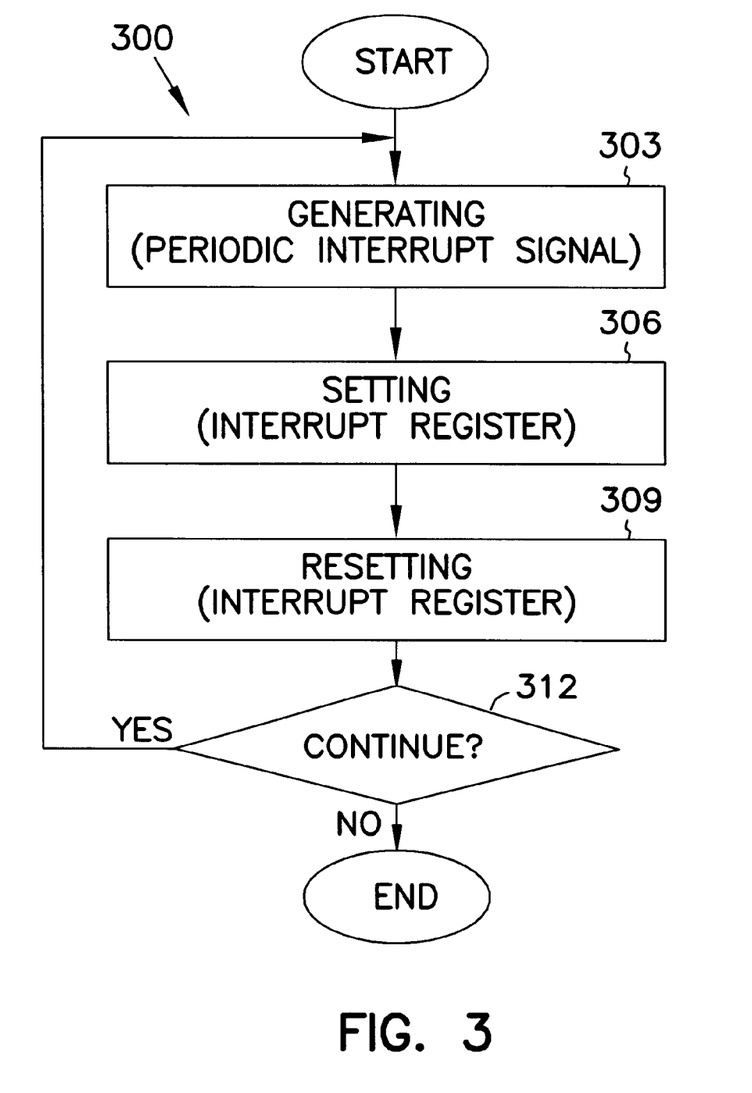
FIG. 3 is a flowchart of a method to be performed by a client according to an exemplary embodiment of the invention.

Referring first to FIG. 3, a flowchart of a method to be performed by a client according to an exemplary embodiment of the invention is shown. This method is inclusive of the acts required to be taken by method 300.

FIG. 3 is a flowchart of one embodiment of a method 300 for generating a periodic latched interrupt signal. Such a signal can be very useful to an operating system and the application programs that rely on the operating system for services. For example, to successfully decode a modem data stream, a modem device driver may require notification at one-half microsecond intervals. If an operating system has access to a signal that provides periodic interrupts every one-half microsecond then the operating system can provide the modem device driver the notification that it requires.

In one embodiment, method 300 comprises the operations of generating 303, setting 306, resetting 309, and deciding 312.

A generating 303 operation provides a periodic interrupt signal. In one embodiment, the periodic interrupt signal is generated by a memory mapped counter register decrementing to zero at a known frequency, rolling over or reloading, and then decrementing to zero again. Each time the counter register decrements to zero, it generates an interrupt signal, rolls over or reloads, and decrements to zero again. The frequency of the periodic interrupt signals is determined by the memory mapped counter count value and the frequency of the clock that drives the counter.

A setting 306 operation sets an interrupt flag in a memory mapped interrupt register each time the counter generates an interrupt signal. Since the counter is generating a periodic interrupt signal as a result of the generating 303 operation, an interrupt flag in the memory mapped interrupt register is being set periodically.

A resetting 309 operation resets the interrupt flag in the memory mapped interrupt register at the same frequency at which the latched interrupt signal is generated. In operation, a processing unit receives an interrupt after the interrupt latch is set, and the system routine that services the interrupt resets the interrupt previously set in the memory mapped interrupt register, so that another interrupt can be received. In this way, a processing unit can receive a periodic interrupt signal, and provide timing information to application programs.

A deciding 312 operation is included to permit the termination of the setting of the periodic interrupt signal. In general, a periodic interrupt signal is terminated in order to reset the period of the interrupt signal. For example, if the system is providing notifications at one-half microsecond intervals to a modem device driver, and the communication stream utilizing the modem supported by that device driver completes, the periodic interrupt signal may be applied to a different device driver supporting a communication system requiring notification at one microsecond intervals.

A particular method performed by method 300 of an exemplary embodiment of the invention have been described. The method performed by method 300 for generating a periodic latched interrupt signal has been shown by reference to a flowchart including all the acts from generating 303 to resetting 309.

Figure 4A:
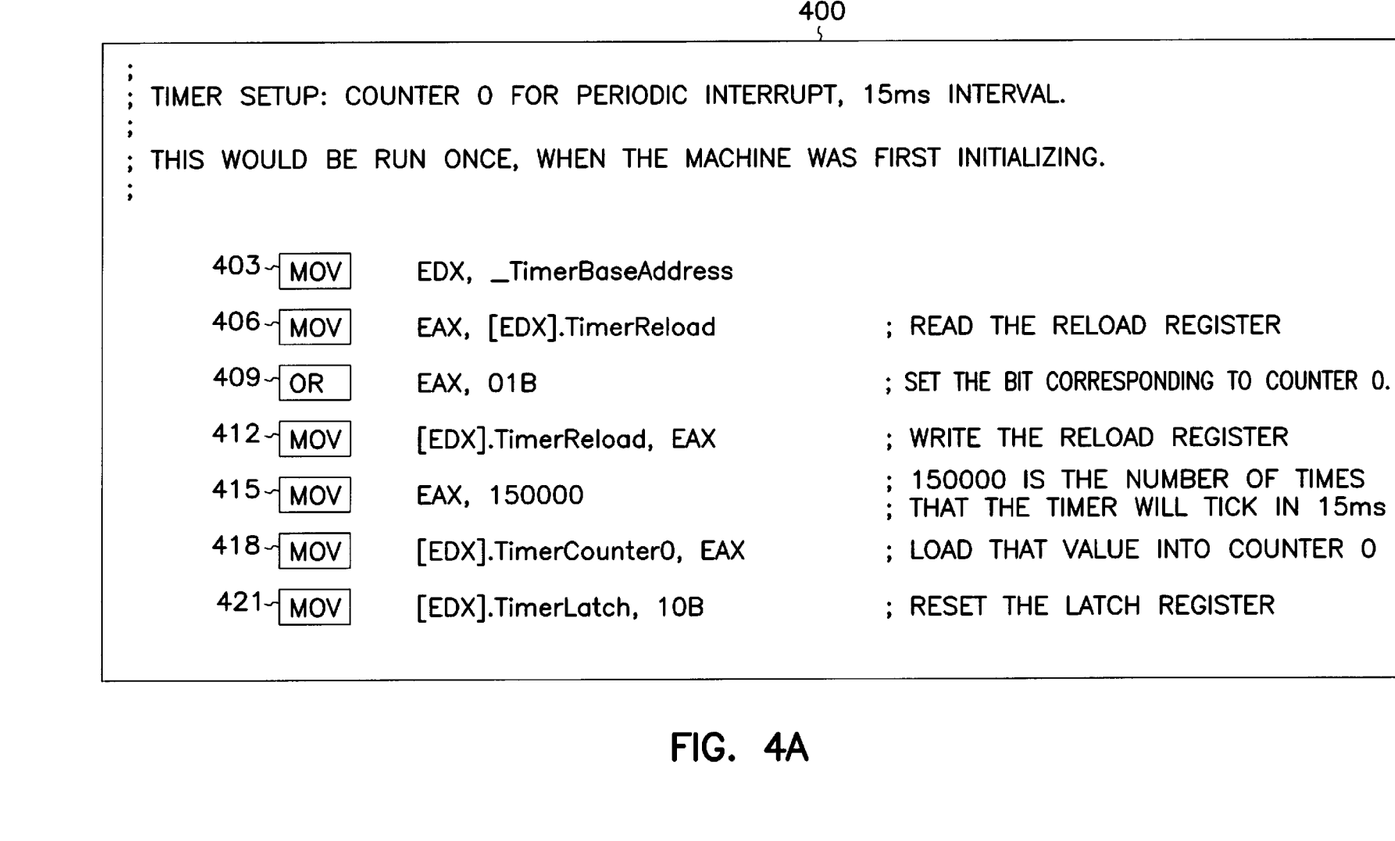
FIG. 4A is a pseudo assembler code listing of a method for preparing a counter register to generate a periodic interrupt for use in an exemplary embodiment of the invention.
Figure 4B:
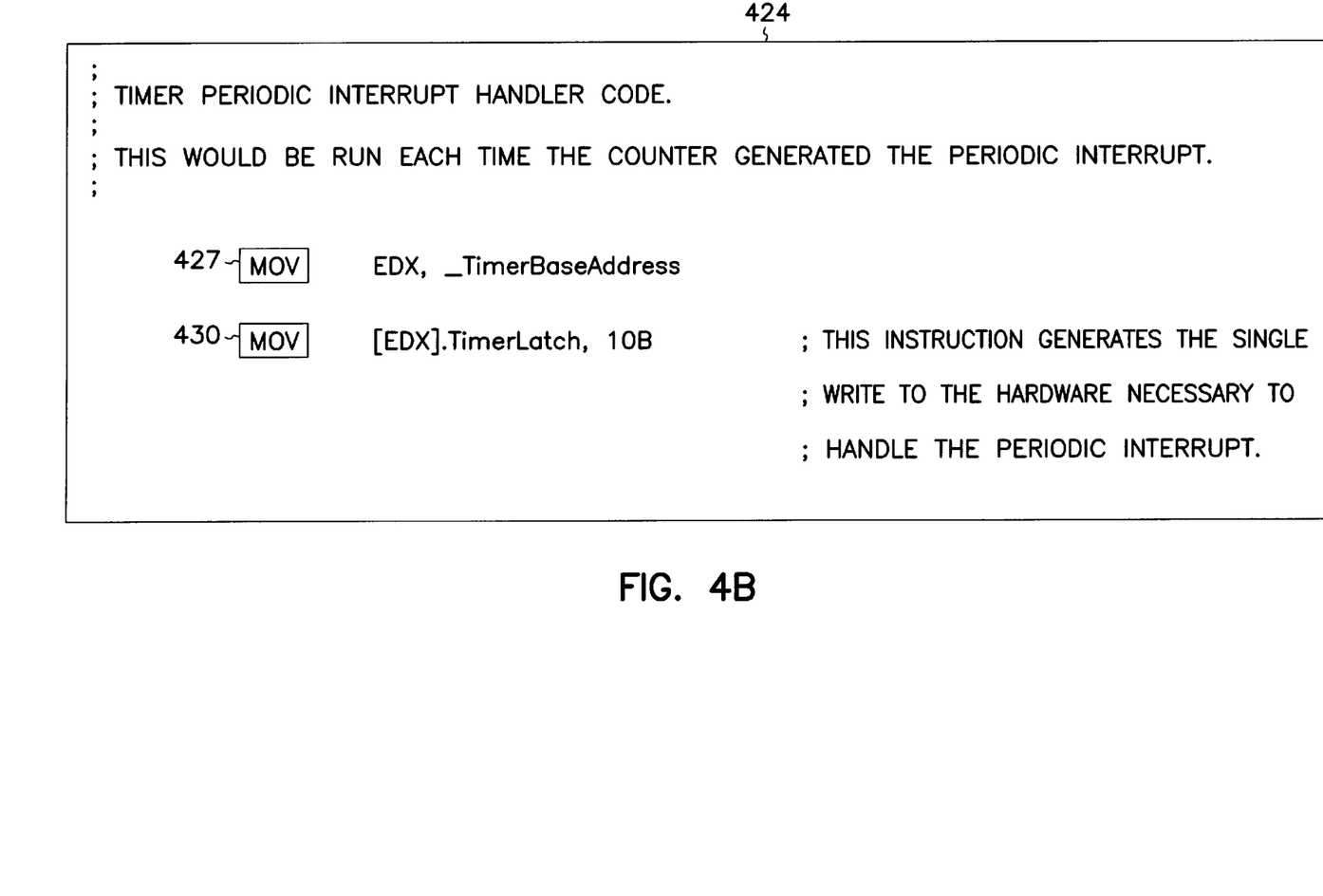
FIG. 4B is a pseudo assembler code listing of a method for handling periodic interrupts for use in an exemplary embodiment of the invention.

FIG. 4A is a pseudo assembler code, listing 400 of one embodiment of a method for preparing counter register 215 or counter register 218 in timer 206 of FIG. 2 to generate a periodic interrupt every 15 milliseconds. FIG. 4B is a pseudo assembler code listing 424 of one embodiment of a method for handling periodic interrupts from timer 206, after counter register 215 or counter register 218 is initialized. For the pseudo assembler code listing 400 of FIG. 4A, the counter register being initialized is referred to as counter 0. After timer 206 is initialized according to the operations of the Timer definition section of Table 1, counter 0 is prepared to generate a periodic interrupt by executing operations 403–421.

Pseudo assembler code listing 400 begins with operation 403, which acquires the timer base address. After reading reload register 212 in operation 406, the information acquired in the read operation is modified in operation 409 by setting a bit corresponding to counter 0. In operation 412, a write to reload register 212 loads the modified information back into reload register 2. Operation 415 moves 150000, which is the number of times that the timer will tick in 15 milliseconds, into a setup location, and operation 418 loads the contents of the setup location into counter 0. Finally, interrupt register 221 is reset.

Pseudo assembler code listing 424 includes MOV operation 427 followed by MOV operation 430. MOV operation 427 acquires the timer base address, and MOV operation 430 generates a single write to the interrupt register 221 to handle the periodic interrupt. An advantage of the present invention is that only a single MOV operation is necessary to service an interrupt. A particular method performed by method 400 and method 424 of an exemplary embodiment of the invention has been described. The method performed by method 400 for generating a periodic interrupt signal, and the method performed by method 424 for handling an interrupt generated by timer 206 has been shown by reference to pseudo assembler code listing 400 and to pseudo assembler code listing 424.

Memory Mapped Implementation

In this section of the detailed description, a particular memory mapped implementation of the invention is described.

Figure 5:
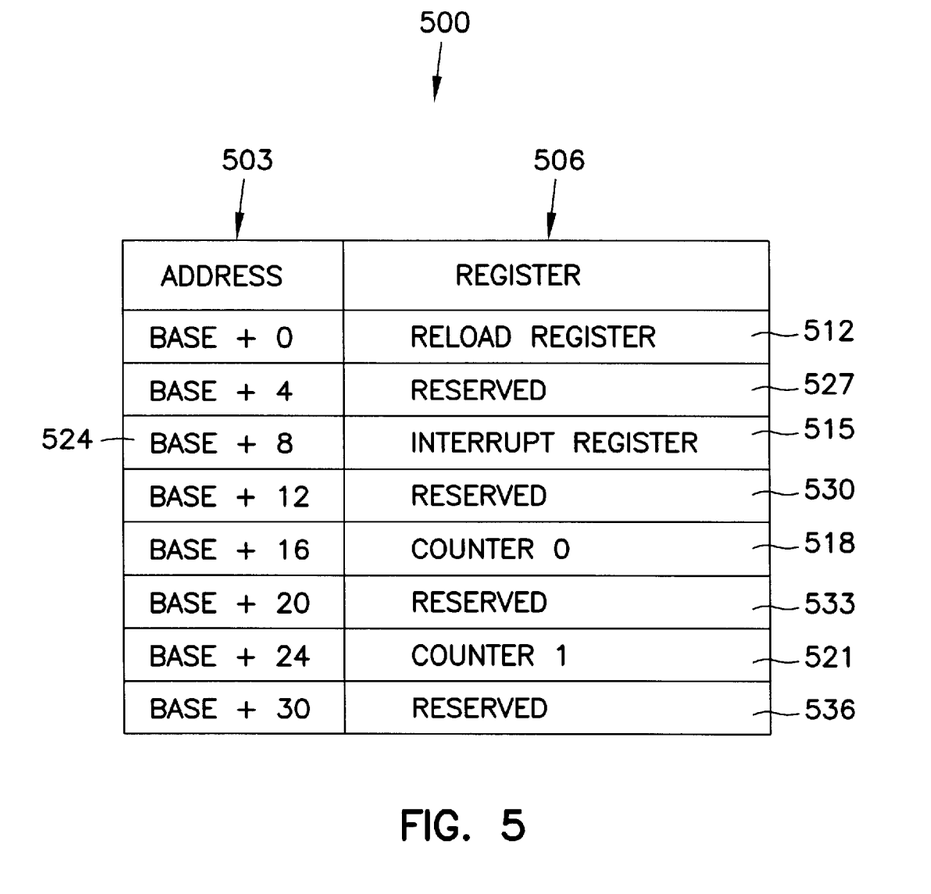
FIG. 5 is a memory mapping diagram for a layout of a timer for use in an exemplary embodiment of the invention.
Figure 6:
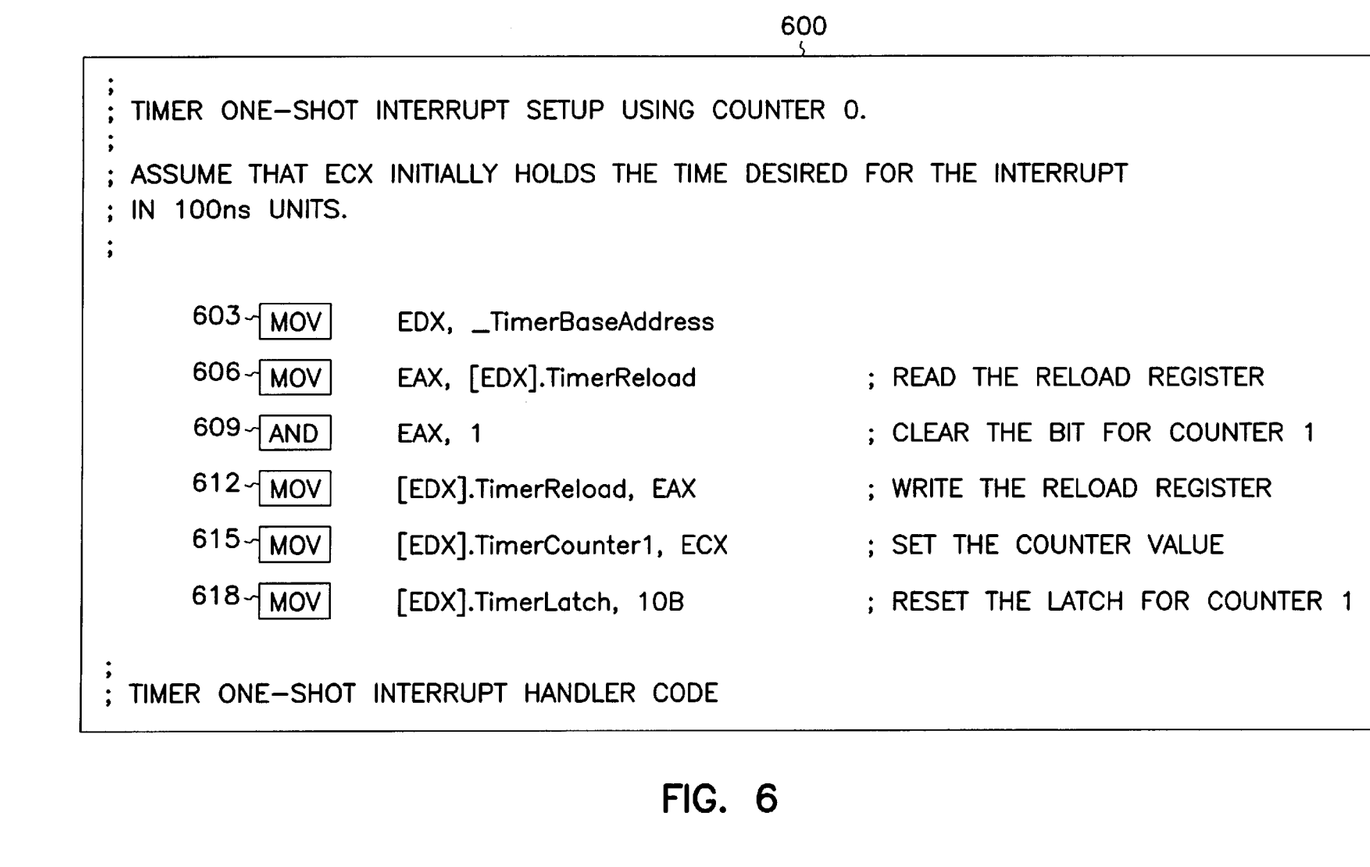
FIG. 6 a pseudo assembler code listing of a method for preparing a one-shot for use in an exemplary embodiment of the invention.

FIG. 5 is a memory mapping diagram 500 of one embodiment of a layout of timer 206 of FIG. 2. FIG. 6 is one embodiment of pseudo assembler code sequence 600 suitable for use in preparing timer 206 to provide a one-shot interrupt signal.

Memory mapping diagram 500 includes memory address column 503 and register name column 506.

Memory address column 503 has entries showing the offset from a base address for the memory mapped registers and the reserved space. As described above, each memory mapped register is aligned on a sixty-four bit boundary, and in the embodiment shown, each memory mapped register and each block of reserved space occupies thirty-two bits.

Register addresses shown in memory address column 503 are shown as an offset in bytes from a base address. For example, the entry for interrupt register 515 is shown as Base+8 524, which defines the memory mapping location of interrupt register 515 as located at an address eight bytes after the Base address.

Several advantages result from this embodiment of the memory mapping data structure. First, aligning each register on a sixty-four bit boundary permits the reading or writing of the memory mapped registers using a single assembler instruction. Second, providing reserved space after each register permits the expansion of the memory mapped register from thirty-two bits to sixty-four bits without changing the addressing scheme.

Register name column 506 shows the names of the memory mapped registers of one embodiment of the present invention. Register entries include reload register 512; interrupt register 515, counter register zero 518, and counter register one 521. In addition to these register entries, register name column 506 includes reserved space 527, 530, 533, and 536. As described above, the reserved space provides for expansion and efficient addressing of the registers.

FIG. 6 is one embodiment of pseudo assembler code listing 600 for preparing timer 206 of FIG. 2 to generate a one-shot interrupt signal. Processes often need to identify the end of a particular time interval, and a one-shot timer interrupt signal is useful for signaling the end of an interval. Assembler code sequence 600 includes MOV operations 603 and 606, AND operation 609, and MOV operations 612, 615, and 618. A MOV operation moves information stored at one location in a computer system to another location in the computer system.

MOV operation 603 moves the timer base address to a temporary storage location for the purpose of addressing the timer registers. After MOV operation 603 executes, MOV operation 606, which reads reload register 212, is followed by AND operation 609, which clears the bit for counter register 215 or counter register 218 in the information read from reload register 212 in order to generate modified read information. In this embodiment, the counter register addressed is referred to as counter 1. Next, MOV operation 612 writes the modified read information back into reload register 212. Finally, MOV operation 615 writes a counter value, which defines the time delay in the one-shot interrupt, into counter 1, and MOV operation 618 resets interrupt register 221 for counter 1. After the time interval defined by the value set into counter 1 in MOV operation 615, timer 206 returns an interrupt to processing unit 203.

TABLE 1

```
;
;Timer definition
;
TimerReload      equ    0
TimerLatch       equ    8
TimeCounter0     equ    16
TimeCounter1     equ    24
;
; Note:  All instructions below that contain the form [edx].
;        TimerXxxx either read from or write to the Event Timer.
;        All other instructions work with values
;        that are in system memory.
;
public__TimerBaseAddress
__TimerBaseAddress  dd   0
;
; Timer setup: counter 0 for periodic interrupt, 15 ms interval.
;
; This would be run once, when the machine was first initializing.
;
        mov    edx, __TimerBaseAddress
        mov    eax, [edx] . TimerReload      ;read the Reload Register
        or     eax, 01b                      ;set the bit corresponding
                                             to Counter 0.
        mov    [edx] . TimerReload, eax      ;write the Reload Register
        mov    eax, 150000                   ;150000 is the number
                                             of times
                                             ;that the timer will tick
                                             in 15 ms.
        mov    [edx] . TimeCounter0, eax     ;Load that value
                                             into Counter 0.
        mov    [edx] . TimerLatch, 01b       ;reset the Latch Register
;
; Timer periodic interrupt handler code.
;
; This would be run each time the counter generated the
; periodic interrupt.
;
```

TABLE 1-continued

```
mov     edx, _TimerBaseAddress
mov     [edx] . TimerLatch, 01b      ;this instruction generates
                                      the single
                                     ;write to the hardware
                                      necessary to
                                     ;handle the periodic
                                      interrupt.
(This code would be followed by code that runs the operating
system periodic scheduler.)
;
; Timer one-shot interrupt setup using counter 0.
;
; Assume that ecx initially holds the time desired for the
; interrupt in 100 ns units.
; 100 ns is the internal unit of the period of this interval timer.
;

mov     edx, _TimerBaseAddress
mov     eax, [edx] . TimerReload     ;read the Reload Register
and     eax, 1                       ;clear the bit for counter 1
mov     [edx] . TimerReload, eax     ;write the Reload Register
mov     [edx] . TimerCounter1, ecx   ;set the counter value
mov     [edx] . TimerLatch, 010b     ;reset the latch
                                      for Counter 1
;
; Timer one-shot interrupt handler code
```

(This would be followed by code that performs the task that needed to happen at exactly the time that Counter 1 generated an interrupt.)

Table 1 shows one embodiment of assembler code suitable for use in connection with the present invention. The code illustrates routines for setting up the event timer, handling periodic interrupts, and setting up a one-shot interrupt. An advantage of the event timer is that the assembler routines require only a small number of assembler instructions, and therefore execute very quickly and take up only a small amount of memory. For example, the timer setup routine requires seven assembler instructions. The periodic interrupt handler requires two assembler instructions. And the one-shot setup routine requires six assembler instructions.

Conclusion

An event timer has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the event timer of the present invention can be implemented with a number of registers that differs from the embodiments shown or with a memory mapping that differs from the embodiments shown and still be within the purpose of the present invention.

The terminology used in this application with respect to the described embodiments is meant to include all hardware and software environments. Therefore, it is manifestly intended that this invention be limited only by the following claims and equivalents thereof.

What is claimed is:

1. A computerized system comprising:
   a processing unit;
   a timer coupled to the processing unit, wherein the timer comprises a plurality of interconnected memory mapped registers aligned on sixty-four bit word boundaries, and a clock coupled to at least one of the plurality of interconnected memory mapped registers; and
   a timer process capable of executing on the processing unit and capable of communicating directly with each of the plurality of memory mapped registers using a single assembler instruction.

2. The computerized system of claim 1, wherein the timer is capable of providing periodic interrupts and one-shot interrupts to the processing unit.

3. The computerized system of claim 1, wherein the timer is capable of simultaneously providing a plurality of periodic interrupt streams, wherein each of the plurality of periodic interrupt streams is capable of having a different frequency.

4. A computerized system comprising:
   a processing unit;
   a plurality of memory mapped counter registers coupled to the processing unit, wherein each of the plurality of memory mapped counter registers is capable of generating an interrupt signal;
   a clock coupled to each of the plurality of memory mapped counter registers;
   a memory mapped reload register coupled to the processing unit and at least one of the plurality of memory mapped counter registers, wherein the memory mapped reload register is capable of defining whether a coupled memory mapped counter register is to rollover or start counting from a restart value after generating the interrupt signal;
   a memory mapped interrupt register coupled to the processing unit and at least one of the plurality of memory mapped counter registers, wherein the memory mapped interrupt register is capable of receiving the interrupt signal from a coupled memory mapped counter register; and
   a timer process capable of executing on the processing unit and capable of communicating directly with each of the plurality of memory mapped registers using a single assembler instruction.

5. The computerized system of claim 4, wherein at least one of the memory mapped counter registers is aligned on a sixty-four bit word boundary.

6. The computerized system of claim 4, wherein each of the plurality of memory mapped counter registers is capable of providing both periodic interrupts and one-shot interrupts to the processing unit.

7. The computerized system of claim 4, wherein each of the plurality of memory mapped counter registers is a thirty-two bit register.

8. The computerized system of claim 4, wherein each of the plurality of memory mapped counter registers is a sixty-four bit register.

9. The computerized system of claim 4, wherein a complete periodic timer setup routine requires only seven or fewer simple assembler instructions.

10. The computerized system of claim 9, wherein the simple assembler instructions are selected from the group consisting of AND, OR and MOV.

11. The computerized system of claim 4, wherein a complete one-shot timer setup routine requires only six or fewer simple assembler instructions.

12. The computerized system of claim 11, wherein the simple assembler instructions are selected from the group consisting of AND, OR and MOV.

13. A timer comprising:
   a counter register capable of being memory mapped and of generating an interrupt signal;
   a clock coupled to the counter register;
   a reload register coupled to the counter register, wherein the reload register is capable of being memory mapped and of defining a rollover value for the counter; and
   an interrupt register coupled to counter, wherein the interrupt register is capable of being memory mapped and of indicating whether the memory mapped counter has set an interrupt;
   wherein the counter register, the reload register and the interrupt register are each capable of being read and written directly by a single assembler language instruction.

14. The system of claim 13, wherein a single bit in the reload register is capable of defining whether the counter register rolls over to a preset value or whether the counter register rolls over to its all ones value.

15. The system of claim 13, further comprising a second counter register coupled to the clock, the reload register, and the interrupt register, and capable of being memory mapped and of generating an interrupt signal.

* * * * *

UNITED STATES PATENT AND TRADEMARK OFFICE
CERTIFICATE OF CORRECTION

PATENT NO. : 6,587,958 B1
DATED : July 2, 2003
INVENTOR(S) : Oshins et al.

It is certified that error appears in the above-identified patent and that said Letters Patent is hereby corrected as shown below:

Column 1,
Line 47, "problems:" should read -- problems. --.
Line 53, "modem" should read -- modern --.

Column 3,
Line 63, "computer may" should read -- computer 20 may --.

Column 4,
Line 44, "Other" should read -- other --.

Column 5,
Line 17, "typically, includes" should read -- typically includes --.

Column 6,
Line 28, "ten" should read -- ten- --.

Column 10,
Line 1, "512;" should read -- 512, --.

Signed and Sealed this

Twenty-second Day of June, 2004

JON W. DUDAS
*Acting Director of the United States Patent and Trademark Office*